United States Patent [19]

Erhardt

[11] Patent Number: 4,610,576
[45] Date of Patent: Sep. 9, 1986

[54] SINGLE-TOOTH CUTTER FOR SLOPING THE FACES OF THE TEETH OF GEARS

[75] Inventor: Manfred Erhardt, Puchheim, Fed. Rep. of Germany

[73] Assignee: Carl Hurth Maschinen und Zahnradfabrik GmbH & Co., Munich, Fed. Rep. of Germany

[21] Appl. No.: 632,561

[22] Filed: Jul. 19, 1984

[30] Foreign Application Priority Data

Aug. 17, 1983 [DE] Fed. Rep. of Germany ....... 3329697

[51] Int. Cl.$^4$ ............................................. B23F 21/00
[52] U.S. Cl. ........................................ 407/21; 407/28; 409/8
[58] Field of Search ................................... 407/20-29, 407/70, 71; 409/8

[56] References Cited

U.S. PATENT DOCUMENTS

| | | | |
|---|---|---|---|
| 1,903,988 | 4/1933 | Fickett | 407/28 |
| 1,955,357 | 4/1934 | Christman | 407/21 |
| 2,682,099 | 6/1954 | Wildhaber | 407/29 |
| 3,091,021 | 5/1963 | Saari | 407/22 |
| 3,760,476 | 9/1973 | Katthaus | 407/21 |

FOREIGN PATENT DOCUMENTS 1048762  1/1959  Fed. Rep. of Germany ........ 407/28

Primary Examiner—Francis S. Husar
Assistant Examiner—Jerry Kearns
Attorney, Agent, or Firm—Flynn, Thiel, Boutell & Tanis

[57] ABSTRACT

A single-tooth cutter for sloping the axial face of gears, in which the gear which is to be worked performs a continuous or step-by-step rotary movement whereby successive rotations of the single-tooth cutter will cause a working on successive teeth at least one sloped surface, and in which the workpiece and the single-tooth cutter after each workpiece rotation approach one another, until the desired sloped shape is reached, the chip removal occurring through the provision of at least two edges which in peripheral direction are arranged one directly behind the other. A cutter which can also be used for this has two edges which act one directly after the other, which edges can have a different distance from the axis of rotation of the cutter.

8 Claims, 3 Drawing Figures

SINGLE-TOOTH CUTTER FOR SLOPING THE FACES OF THE TEETH OF GEARS

FIELD OF THE INVENTION

The invention relates to a single-tooth cutter for sloping the axial faces of the teeth of gears.

BACKGROUND OF THE INVENTION

For sloping the faces of teeth of gears, a continuous method is known (German AS No. 1 048 762), in which a so-called single-tooth cutter is used, whereby the single-tooth cutter performs a continuous rotary movement and during successive rotations works on successive workpiece teeth at least one sloped surface.

After each workpiece rotation, the cutter teeth and the workpiece teeth approach one another and subsequently each tooth is again worked in the aforedescribed manner. Feeding and subsequent working are repeated until the desired sloped shape is achieved.

It is disadvantageous for only single-tooth cutters to be used, because the entire machining process is to be performed by only one edge, which according to their nature do not have a long edge life. Cutters with two or more teeth are not usable, since otherwise the workpiece movement, which can be performed only when the cutter is not on the workpiece, would be impossible. The cutters thus must be changed often, which is always associated with a period of inoperativeness of the machine. A premature failure of the edge, for example if a portion of the edge breaks off, results in insufficiently machined workpieces, which has particularly bothersome consequences in the case of interlinked machines, wherein the workpieces after the sloping process has been completed are fed to different working machines.

Therefore, the basic purpose of the invention is to provide a novel single-tooth cutter construction having a longer edge life.

The inventive purposes are attained by providing a single-tooth cutter enabling, in the instance where a section of the sloped surface which remains unworked due to a damaged first edge, is worked by the second or next-following further edge. Still more advantageous is the provision of a single-tooth cutter comprised of plural individual plates, because a rough finishing effect is achievable as is specially high machining quality, whereby the risk of an edge of a cutter breaking off at a second and possibly the next-following cutting edge is extremely small because of the very low machining volume which they must accomplish. Therefore, a substantial extension of the edge life can be achieved with the single-tooth cutters embodying the invention.

BRIEF DESCRIPTION OF THE DRAWINGS

The invention will be described hereinbelow with reference to one exemplary embodiment, in which.

DETAILED DESCRIPTION

Figure 1:
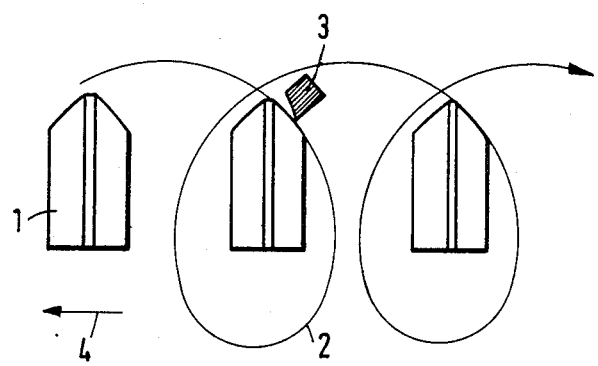
FIG. 1 is a schematic illustration of the sloping accomplished by a single-tooth cutter.

FIG. 1 illustrates a number of teeth 1 of a gear shown in a single plane. The line which is identified by the reference numeral 2 is the movement through which the tooth 3 of a single-tooth cutter moves relative to the workpiece. The workpiece undergoes a movement in the direction of the arrow 4. The axis of the workpiece and the axis of the cutter are, in addition, inclined or skewed to one another.

Figure 2:
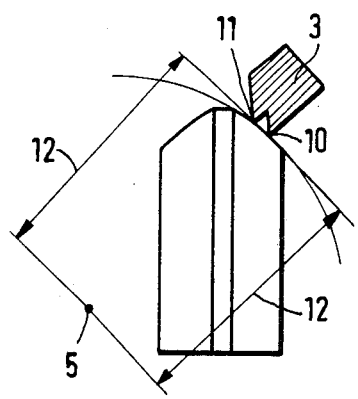
FIG. 2 illustrates a single-tooth cutter embodying the invention.

FIG. 2 illustrates an arrangement wherein the tooth 3 has two edges identified by the reference numerals 10 and 11. (It is to be recognized that it is also possible to provide more edges on the tooth.) Both edges are spaced at the same distance from the cutter axis 5, so that the edge 11 becomes effective only when the edge 10 at least locally fails to act on the tooth.

Figure 3:
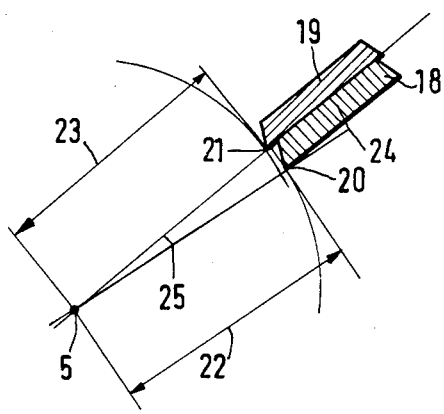
FIG. 3 illustrates a further construction of a single-tooth cutter embodying the invention.

Another arrangement of the edges is illustrated in FIG. 3. In this embodiment, there are two cutting plates 18, 19 arranged such that the edge 20 of the first cutting plate has a slightly greater distance 22 from the cutter axis 5 than the distance 23 of the edge 21 of the second cutting plate 19. The edge 20 enables or performs a rough machining operation whereas the edge 21 enables or performs a finish machining operation. The edge 21 and its front face 24 lies in one common plate 25 with the cutter axis 5. This construction facilitates not only a simple adjusting of the single-tooth cutter relative to the workpiece, because the edge 21 produces exactly the desired slope shape during the last chip removal, but also the insertion of the cutting plates 18, 19 into the here-not-illustrated cutter as well as their clamping in place, since both cutting plates lie completely aligned on one another, thus must not be installed offset to one another.

The embodiments of the invention in which an exclusive property or privilege is claimed are defined as follows:

1. In a single-tooth cutter for sloping the axially facing end faces of teeth of gears by a hob-milling method, said cutter being rotatably supported for movement about an axis of rotation, and having thereon a cutting tooth with a cutting edge means spaced radially outwardly from said axis of rotation, said cutting edge means extending along a side of said cutting tooth which faces said axis of rotation of said cutter for effecting a working, during successive rotations of said cutter, at least one sloped surface on said axially facing end faces of said teeth on said gears, the improvement comprises wherein said cutting edge means includes plural cutting edges, and wherein at least two individual cutting edges follow one another in a peripheral direction of said cutter and lie on the same flight circle.

2. The single-tooth cutter according to claim 1, wherein said plural cutting edges are defined by at least two cutting edges on said cutter tooth.

3. In a single-tooth cutter for sloping the axially facing end faces of teeth of gears by a hob-milling method, said cutter being rotatably supported for movement about an axis of rotation and having thereon a cutting tooth with a cutting edge means spaced radially outwardly from said axis of rotation, said cutting edge means extending along a side of said cutting tooth which faces said axis of rotation of said cutter for effecting a working, during successive rotations of said cutter, at least one sloped surface on said axially facing end faces of said teeth on said gears, the improvement comprising wherein said cutting edge means includes plural cutting edges, and wherein at least two individual cutting edges of said cutting edge means follow one another in a peripheral direction of said cutter, said individual cutting edges being arranged circumferentially offset in such a manner that a leading one of said cutting edges which precedes the one of said cutting edges in the direction of movement of said cutter decisive for determining the desired shape of said slope lie a greater distance from said axis of rotation and on a greater flight circle than said leading edge.

4. The single-tooth cutter according to claim 3, wherein said plural cutting edges are defined by at least two cutting edges on said cutter tooth.

5. The single-tooth cutter according to claim 3, wherein said plural cutting edges are defined by plural and stacked cutting plates, the number thereof corresponding to the number of said cutting edges.

6. The single-tooth cutter according to claim 5, wherein a front face of a cutting plate which is oriented so as to present the last cutting edge working on said teeth on said gears and said axis of rotation lie in a common plane.

7. The single-tooth cutter according to claim 1, wherein a front face of a cutting edge which is oriented so as to be the last cutting edge working on said teeth on said gears and said axis of rotation lie in a common plane.

8. The single-tooth cutter according to claim 3, wherein a front face of a cutting edge which is oriented so as to be the last cutting edge working on said teeth on said gears and said axis of rotation lie in a common plane.

* * * * *